United States Patent Office 2,971,954
Patented Feb. 14, 1961

2,971,954
PURIFICATION OF PHOSPHATE-MODIFIED STARCHES

Rudolph Kodras, Skokie, Ill., assignor to International Minerals & Chemical Corporation, a corporation of New York No Drawing. Filed June 24, 1958, Ser. No. 744,064

10 Claims. (Cl. 260—233.5)

The present invention relates to phosphate-modified starches. More particularly, it relates to alkali-metal phosphate-modified starches and to a method for purification and for further modification thereof.

The preparation of alkali-metal phosphate-modified starches is described by Hans Neukom in U.S. Patents 2,865,762 and 2,884,412, which issued respectively on December 23, 1958 and April 28, 1959. In the Neukom method starch is impregnated with an aqueous solution of a phosphate salt, dried to a moisture content less than about 15% by weight, then heated to an elevated temperature at which the substance reacts in a way not well understood, producing a modified starch of ready dispersibility in cold water.

An object of the present invention is to purify alkali-metal phosphate-modified starches of the Neukom type.

Another object is to provide a phosphate-modified starch of increased viscosity in aqueous dispersion.

Another object is to fractionate alkali-metal phosphate-modified starches of the Neukom type and to separate therefrom a phosphate-modified starch fraction of increased viscosity and improved properties.

Another object is to separate a phosphate-modified starch from an alkali-metal phosphate-modified starch of the Neukom type.

Other objects of the invention will be apparent from the following description and claims.

In a preferred embodiment of the invention, an alkali-metal phosphate-modified starch of the Neukom type is dispersed in water, the pH is adjusted to about pH 3.0 or below by addition of hydrochloric acid or other strong mineral acid, and a purified fraction of phosphate-modified starch is precipitated therefrom by addition of an oxygen-containing water-miscible organic liquid, such as methanol, acetone, or the like, as will be more fully illustrated hereinafter. The precipitate is separated from the liquid phase, and may be dried if desired. The resulting solid is the improved composition of the present invention. It contains a decreased proportion of inorganic phosphate, color bodies, and other impurities; and aqueous dispersions thereof are substantially higher in viscosity than dispersions of the original Neukom material. Moreover, by operating at pH levels sufficiently low (below about 0.5), both the inorganic phosphates and the alkali-metal ions are removed, and the phosphate-modified starch is obtained in acid form, unassociated with alkali-metal ions.

In another embodiment of the invention, an alkali-metal phosphate-modified starch of the Neukom type is slurried in an aqueous solvent comprising an oxygen-containing organic liquid, as defined hereinafter, in a proportion such that the phosphate-modified starch components of higher viscosity characteristics remain undissolved therein. The resulting slurry is acidified to pH 3.0 or below with mineral acid to dissolve a high proportion of the inorganic phosphates, color bodies, and other impurities therein, and the purified solid-phase phosphate-modified starch is filtered off.

In preparing the alkali-metal phosphate-modified starches of Neukom, ungelatinized starch is heated at a temperature between about 120 and about 175° C. with certain alkali-metal orthophosphate salts. In a representative method, ungelatinized starch is immersed in an aqueous solution of an alkali-metal orthophosphate, the liquid phase is removed, the starch is dried to a water content below about 15% by weight at a temperature below the gelatinization point of the particular starch, and the resulting mixture is heated for around 1 to 15 hours at about 130 to 170° C., preferably about 5 hours at about 160° C., the length of the heating period varying with the temperature. A cold-water dispersible starch is obtained thereby having a viscosity from about 1,000 centipoises upward, ordinarily from about 3,000 to about 20,000 cps., measured in 5% aqueous dispersion at room temperature.

Preferred phosphate salts are sodium, potassium, and lithium orthophosphates, alone or in suitable combinations to yield a pH in aqueous solution between about 4 and about 7, preferably around 6 to 7, measured at 25° C. at the conceneration employed. For example, monsodium orthophosphate and disodium orthophosphate are combined in aqueous solution in such proportions as to produce a pH between about 6 and about 7. Or the desired salts can be formed in situ, for example by dissolving trisodium orthophosphate or other basic phosphate salt in water and adjusting the pH of the solution to the desired level by adding orthophosphoric acid or an acidic orthophosphate salt. Alternatively, orthophosphoric acid or an acidic orthophosphate salt in aqueous solution can be adjusted upward to the desired pH by adding an alkali-metal hydroxide or a basic alkali-metal orthphosphate salt.

The phosphate solution may suitably be between about 1 and about 3 molar in orthophosphate and should be used in a quantity equivalent to at least about 1% by weight of phosphorus, preferably between about 3 and about 5%, based on the quantity of starch to be treated. The quantity and concentration of the solution are preferably chosen so that the starch will absorb the entire quantity thereof and will be substantially completely saturated therewith, while remaining largely unagglomerated. The weight of starch will generally be at least as great as the weight of the water contained in the solution, and will preferably be about twice the weight of the water. Alternatively, the starch can be soaked in an excess of phosphate solution, then separated therefrom by filtration, centrifugation, or the like. The soaked granules are dried, suitably in air, at a temperature below the point at which starch gelatinizes, e.g., below about 60 to 80° C., depending upon the particular starch. The resulting granules, which generally contain between about 8 and about 15% of water, are subjected to a heat treatment as set forth hereinabove. The heat-treated material is an alkali-metal phosphate-modified starch suitable for use as the starting material in the present invention.

In a preferred embodiment of the present invention, a quantity of alkali-metal phosphate-modified starch is dispersed in water in a proportion between about 1 and about 15% by weight or higher up to the saturation level. The higher the viscosity of the starting material, the lower the preferred concentration thereof. When the starting material is in the form of a dry powder, it tends to cake when added to water; this can be prevented by first wetting the powder with a small proportion of an organic liquid of the type thereafter to be used as a precipitant from the aqueous solution. The resulting dispersion is then adjusted to around pH 3.0 or below, depending upon the nature of the product desired, by adding a sufficient quantity of hydrochloric acid, sulfuric acid, phosphoric acid, or other mineral acid. To the acidified solution is then added a quantity of an oxygen-containing water-miscible organic liquid to precipitate the alkali-metal phosphate-modified starch in purified form, either as the free acid or the alkali-metal salt thereof, depending upon the pH of the dispersion. The precipitation is carried out at a temperature between about 10 and about 75° C. and below the gelatinization point of the composition being treated, preferably between about 20 and about 30° C.

The proportion of organic liquid employed in the treating solvent should be sufficiently high that the phosphate-modified starch fractions of high viscosity are insoluble therein, but low enough to solubilize unbound phosphate salts, other inorganic salts, less-viscous starch fractions, unmodified starches, and other substances. The proportion of organic liquid should be at least about 35% by volume, based on the total volume of liquids present in the dispersion, and should be less than about 65% by volume. The preferred range is between about 50 and about 65% by volume. The selective solvent action of the mixed solvent is rapid, and the resulting slurry can be promptly filtered, centrifuged, or otherwise treated to separate the solid phase. The solids retain a quantity of the organic precipitating liquid, which should be removed for many product applications (e.g., in food). This is conveniently done by washing the solids with anhydrous organic liquid to remove the water content therein, then drying, suitably in air, and preferably at a temperature not exceeding about 80° C. The removal of the water prior to drying is desirable to avoid hydrolysis, saponification, gelatinization, and other side reactions during the drying operation. For many purposes, the product need not be treated to remove the organic liquid, and the wet solids can be used without further treatment. In either event, the precipitate is a material of improved viscosity and purity, the viscosity being ordinarily at least about double the viscosity of the starting material.

It will be apparent that the precipitation of phosphate-modified starch in accordance with the preferred embodiment of the invention can be carried out two, three, or more times on a given batch of the starting material in order to effect further purification and viscosity increase. In such repetitive treatment, the precipitate from the prior step can conveniently be directly retreated, without an intermediate preparation of any sort.

The organic liquid employed in the present invention is an oxygen-containing water-miscible organic substance which is inert toward the contents of the purification medium under the conditions employed. Such substances, when used as defined above, are antisolvents for high-viscosity alkali-metal phosphate-modified starches and for the acidic forms thereof, but not for the various impurities existing therein. Suitable liquids include acetone, dioxane, tetrahydrofurfuryl alcohol, the water-miscible aliphatic monohydric alcohols, e.g., methanol, ethanol, n-propyl alcohol, and isopropyl alcohol; the water-miscible aliphatic polyhydric alcohols, such as ethylene glycol, propylene glycol, glycerol, and the like; the water-miscible aliphatic ether-alcohols, such as ethylene glycol methyl ether and diethylene glycol ethyl ether; the water-miscible glycol diethers, such as diethylene glycol diethyl ether; and the like.

The compositions obtained in the present invention can be bleached if desired by treatment, preferably prior to precipitation, with a mild oxidizing agent, such as bleaching powder or chlorine. Any excess of bleaching agent can be removed by addition of sodium bisulfite or other mild reducing agent.

The following specific examples will more fully illustrate the invention:

*Example 1*

A technical-grade sodium phosphate-modified starch of the Neukom type having a viscosity of 3,200 cps. in 5% aqueous dispersion at room temperature was admixed in the amount of 500 grams with 1.1 liter of aqueous 50% methanol. The resulting slurry, having a pH of 7.3, was acidified to pH 2.0 by addition of 75 grams of 37% hydrochloric acid, after which the mixture was stirred at room temperature for 20 minutes. The slurry was then filtered, and the filtration solids were washed first with aqueous 50% methanol, then with 99% methanol, and finally dried in air at room temperature. The product obtained thereby had a viscosity of 22,400 cps. in 5% aqueous dispersion at room temperature, measured with a Brookfield "Synchro-Lectric" viscometer.

*Example 2*

A 15-gram portion of Neukom-type sodium phosphate-modified starch having a viscosity of 25,500 cps. in 5% aqueous dispersion at room temperature was wetted with methanol, then admixed with 300 ml. of distilled water and stirred until fully dispersed except for a few small lumps. The dispersion, having a pH of 7.1, was adjusted to pH 2.0 by adding 2.5 g. of 37% hydrochloric acid with stirring, as a result of which the lumps quickly dispersed and the mixture became thin and yellow. Stirring was continued, and 900 ml. of methanol were added, causing a granular precipitate to form. The resulting slurry was filtered, and the filtrate was found to have a pH of 3.2. The filter cake was washed with 200 ml. of methanol, broken up into small granules, and dried 2 hours at 80° C. The dried material was found to have a viscosity of 63,000 cps. in 5% aqueous dispersion at room temperature.

The products of the present invention are useful for many purposes—in food products, as a thickener, a stabilizer, a binder, or an extender; in textiles, as a fiber coating; in paper, as a sizing agent; and in ore flotation, as a slime inhibitor.

While the invention has been described with reference to specific starting materials, process steps and conditions, manipulative details, and the like, it is to be understood that such matters are illustrative only and not as indicative of the scope of the invention. Numerous modifications and equivalents of the invention will be apparent from the foregoing description to those skilled in the art.

In accordance with the foregoing description, the following claims particularly point out and distinctly claim the subject matter of the invention:

1. A process for treating an alkali-metal phosphate-modified starch and separating therefrom a phosphate-modified starch fraction of higher purity and increased viscosity when dispersed in water, said modified starch having been obtained by reaction of ungelatinized starch with an alkali-metal orthophosphate in the presence of less than about 15% by weight of water at a temperature between about 120 and about 175° C., which comprises contacting said alkali-metal phosphate-modified starch at a pH below about 3 with an aqueous solvent comprising an inert oxygen-containing water-miscible organic liquid in a proportion, between about 35 and about 65% by volume of the total solvent, such that phosphate-modified starch fractions of higher viscosity are insoluble therein while unbound inorganic salts and lower-viscosity starch fractions are soluble, and separating a phosphate-modified starch fraction of higher viscosity as the solid phase from the resulting slurry.

2. A process for treating an alkali-metal phopsate-modified starch and separating therefrom a phosphate-modified starch fraction of higher purity and increased viscosity when dispersed in water, said modified starch having been obtained by reaction of ungelatinized starch with an alkali-metal orthophosphate in the presence of less than about 15% by weight of water at a temperature between about 120 and about 175° C., which comprises dispersing said alkali-metal phosphate-modified starch in water, adjusting the resulting dispersion to less than pH 3.0 by adding a mineral acid thereto, adding to the acidified dispersion an inert oxygen-containing water-miscible organic liquid in a proportion, between about 35 and about 65% by volume of the total solvent, sufficiently high to precipitate a phosphate-modified starch fraction of higher purity and increased viscosity in aqueous dispersion than the original material while retaining unbound inorganic salts and lower-viscosity starch fractions in the dispersed state, and separating the precipitate from the resulting slurry.

3. A process wherein an alkali-metal phosphate-modified starch is subjected to a multiplicity of dispersing and precipitating steps as in claim 2.

4. A process for treating an alkali-metal phosphate-modified starch and separating therefrom a phosphate-modified starch fraction of higher purity and increased viscosity when dispersed in water, said modified starch having been obtained by soaking starch in an aqueous solution of an alkali-metal orthophosphate having a pH between about 4 and about 7, drying the starch to a water content below about 15% by weight at a temperature below the point at which starch gelatinizes, and heating the dried starch at a temperature between about 130 and about 170° C. for around 1 to 15 hours, which process comprises dispersing said alkali-metal phosphate-modified starch in water, adding mineral acid to the resulting dispersion to a pH below about 3.0, adding to the acidified dispersion a water-miscible aliphatic monohydric alcohol in a quantity sufficient to produce a mixed solvent containing between about 35 and about 65% by volume of said alcohol, whereby a precipitate of purified phosphate-modified starch is produced, having a higher viscosity in aqueous dispersion than the original material, while unbound inorganic salts and lower-viscosity starch fractions are retained in the dispersed state, and separating the precipitate from the resulting slurry.

5. The process of claim 4 wherein said alcohol is methanol.

6. The process of claim 4 wherein said alcohol is ethanol.

7. The process of claim 4 wherein the proportion of said alcohol in said mixed solvent is between about 50 and about 65% by volume.

8. The process of claim 4 wherein said precipitation of purified phosphate-modified starch is effected at a temperature between about 10 and about 75° C.

9. The process of claim 4 wherein said precipitation of purified phosphate-modified starch is effected at a temperature between about 20 and about 30° C.

10. A process for preparing an improved phosphate-modified starch, which comprises preparing an aqueous dispersion containing between about 1 and about 15% by weight of an alkali-metal phosphate-modified starch, the latter having been obtained by soaking starch in an aqueous alkali-metal orthophosphate solution having a concentration between about 1 and about 3 molar in phosphate and a pH between about 6 and about 7, drying the starch at a temperature below about 60° C. to a water content between about 8 and about 15%, and heating the dried starch at a temperature around 160° C. for about 5 hours; adjusting the aqueous dispersion of said alkali-metal phosphate-modified starch to a pH below about 3.0 by adding hydrochloric acid thereto, adding methanol to the acidified dispersion in a quantity sufficient to produce a mixed solvent containing between about 50 and about 65% by volume of methanol, whereby a precipitate of purified phosphate-modified starch is produced, having an increased purity and a higher viscosity in aqueous dispersion than the original material, while unbound inorganic salts and lower-viscosity starch fractions are retained in the dispersed state, and recovering said precipitate from the resulting slurry.

References Cited in the file of this patent

UNITED STATES PATENTS

| | | |
|---|---|---|
| 2,686,779 | Jones | Aug. 17, 1954 |
| 2,824,870 | Neukom | Feb. 25, 1958 |
| 2,865,762 | Neukom | Dec. 23, 1958 |
| 2,868,780 | Minkema | Jan. 13, 1959 |